(12) United States Patent
Joffe et al.

(10) Patent No.: US 6,671,061 B1
(45) Date of Patent: Dec. 30, 2003

(54) FAX BROADCAST FROM A SINGLE COPY OF DATA

(75) Inventors: Neil Raymond Joffe, Palo Alto, CA (US); Gregory Scott Mercurio, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,115

(22) Filed: Jan. 8, 1999

(51) Int. Cl.[7] .................................................. H04N 1/00
(52) U.S. Cl. ...................... 358/1.15; 358/402; 358/407; 358/444; 379/100.01; 379/100.09
(58) Field of Search ................................ 358/1.15, 402, 358/403, 407, 440, 444, 468; 709/238, 239, 240; 379/100.01, 100.08, 100.09, 100.11, 93.23, 93.24

(56) References Cited

U.S. PATENT DOCUMENTS

| | | | |
|---|---|---|---|
| 4,918,722 A | | 4/1990 | Duehren et al. ............ 379/100 |
| 4,941,170 A | * | 7/1990 | Herbst ................... 379/100.07 |
| 5,291,546 A | | 3/1994 | Giler et al. ................. 379/100 |
| 5,369,686 A | | 11/1994 | Dutra et al. .................. 379/94 |
| 5,488,651 A | | 1/1996 | Giler et al. ................. 379/100 |
| 5,712,907 A | | 1/1998 | Wegner et al. .............. 379/112 |
| 5,739,919 A | * | 4/1998 | Lee et al. ................... 358/407 |
| 5,767,985 A | | 6/1998 | Yamamoto et al. ......... 358/402 |
| 5,793,498 A | * | 8/1998 | Scholl et al. ............... 358/434 |
| 5,805,298 A | * | 9/1998 | Ho et al. .................... 358/402 |
| 5,805,816 A | * | 9/1998 | Picazo, Jr. et al. .......... 709/223 |
| 5,812,278 A | | 9/1998 | Toyoda et al. ............. 358/402 |
| 5,828,468 A | * | 10/1998 | Lee et al. ................... 358/434 |
| 5,838,683 A | | 11/1998 | Corley et al. ............... 370/408 |
| 5,872,845 A | * | 2/1999 | Feder ......................... 358/442 |
| 5,881,064 A | * | 3/1999 | Lin et al. .................... 370/389 |
| 6,356,356 B1 | * | 3/2002 | Miller, Jr. et al. ......... 358/1.15 |

FOREIGN PATENT DOCUMENTS

| | | | | |
|---|---|---|---|---|
| WO | WO-96/41463 A1 | * | 12/1996 | ............ H04N/1/00 |
| WO | WO 97/18665 | | 5/1997 | ............ H04N/1/32 |
| WO | WO-97/26753 A1 | * | 7/1997 | ............ H04N/1/00 |

* cited by examiner

*Primary Examiner*—Edward Coles
*Assistant Examiner*—Joseph R. Pokrzywa
(74) *Attorney, Agent, or Firm*—Law Offices of Imam (57) ABSTRACT

A fax broadcasting system for use in a packet switching network environment for transferring fascimile information in the form of multiple packets which are received from a sending communications device to a plurality of receiving communications devices includes a networking device for receiving, in packet form, an email message from the sending communication device. The email message includes fascimile (fax) infomation, which is also received in packet form (packets of fax information). The networking device is utilized for transmitting the fax information to the receiving communications devices. The networking device includes a processing device having a plurality of storage spaces, each of said plurality of storage spaces for storing one packet of the fax information (a packet storage space), the processing device for receiving the email message, in packet form, having attached thereto fax information in packet form. As each fax information packet is received, the processing device stores one copy thereof in a corresponding one of the packet storage spaces and sends the stored packets of fax information to the receiving communications devices, wherein no more than one copy of the fax information is stored for broadcasting the same to at least two receiving communications devices.

27 Claims, 7 Drawing Sheets

FAX BROADCAST FROM A SINGLE COPY OF DATA

BACKGROUND OF THE INVENTION

1. Field of the Invention

This invention relates to the field of data transmission systems and particularly data transmission systems employing networking device for transmission of digital information in the form of facsimile transmission to various communications device and more particularly to the transmission of fax information through a packet switching network as an attachment to an email message using the receiving facsimile number as identification of the destination facsimile machine.

2. Description of the Prior Art

Facsimile (fax) devices are a popular mechanism for transmission of information. Packet switching networks, where information, or a message, is transmitted in the form of various packets and then compiled or assembled back together at the receiving site, have gained wide popularity in recent years. This is in part due to the lowering of costs associated with the use of packet switching networks. In a packet switching network environment, such as the Internet, messages in the form of 'email' are transferred around the world from remotely situated communication device to other remotely-situated communication equipment. An example of this is in a packet-switching network environment when a fax-user or a user of a Personal Computer (PC) having modem capability sends an email message to a receiving device having fax capability that may be located in another part of the world that also has modem capability. The information or message that is transmitted from the former user is broken up into packets and each packet, along with address and header information in accordance with industry standards, is processed and sent through a telephone line (or Local Area Network (LAN) or other communication medium) to the receiving device. At the receiving site, the various packets of the message are assembled back together and a user on the receiving end is then able to read the email message.

As the use of email has become widely prevalent recently, more information has been transferred between network equipment through the use of email. For example, word processing application files are now readily transferred between email users, as are Internet web files in the form of Hyper Text Markup Language 'HTML'. Similarly, fax information or data is transmitted as an attachment to an email message to other equipment that accepts reception of faxes. For example, a PC can be set up to send an email message having attached thereto Tagged Image File Format (TIFF) files, which may be transmitted through the Internet to another PC having fax and modem capability or, alternatively, to another fax machine.

Prior art techniques in use today allow for multiple copies of the faxed transmission to be sent to various fax machines or PCs. During the processing of such a fax message and while in route from one PC to another, various copies of the fax message are created and stored in a mass storage media, such as a hard disk, and thereafter individually transmitted to receiving fax machines, PCs, or other receiving devices.

One of the problems with such prior art techniques is that a large amount of storage space is required for storing copies of a fax transmission on a hard disk or other mass storage media. For example, a typical fax cover sheet alone is approximately 50 to 100 k bytes (1 k byte is 1024 bytes and a byte is typically 8 bits wide) in size and requires this amount of space for storage thereof. Furthermore, if more than one fax machine is to receive the transmission, a duplicate copy of the entire fax transmission is kept on the hard disk thereby requiring additional storage space. Storage space, such as hard disk, is expensive because it requires circuitry and components and is costly to develop.

Another problem with existing fax transmissions to various fax devices in prior art systems is that when sending fax information to various fax devices through a network environment such as a packet switching network environment (for example, the Internet), there is much additional network traffic generated thereby decreasing the performance of the overall system and increasing costs to users of such systems who pay toll charges for use thereof.

Therefore, in a packet switching network environment, a method and apparatus is needed for efficient broadcasting of fax messages to multiple fax recipients in an inexpensive manner while maintaining the costs associated with the manufacture of such an apparatus low and further increasing the throughput of the network system and decreasing costs associated with the use of such a system by users thereof.

SUMMARY OF THE INVENTION

Briefly, a preferred embodiment of the present invention includes a fax broadcasting system for use in a packet switching network environment for transferring fascimile information in the form of multiple packets, received from a sending communications device, to a plurality of receiving communications devices. The fax broadcasting system includes a networking device for receiving, in packet form, an email message from the sending communication device, the email message comprising fascimile (fax) infomation, which is also received in packet form (packets of fax information) and the networking device being utilized for transmitting the fax information to the receiving communications devices. The networking equipment includes a processing device having a plurality of storage spaces, each of said plurality of storage spaces for storing one packet of the fax information (a packet storage space), the processing device for receiving the email message, in packet form, having attached thereto fax information in packet form. As each fax information packet is received, the processing device stores one copy thereof in a corresponding one of the packet storage spaces and sends the stored packets of fax information to the receiving communications devices, wherein no more than one copy of the fax information is stored for broadcasting the same to at least two receiving communications devices.

These and other objects and advantages of the present invention will no doubt become apparent to those skilled in the art after having read the following detailed description of the preferred embodiment illustrated in the several figures of the drawings.

DETAILED DESCRIPTION OF THE PREFERRED EMBODIMENTS

The present invention relates to another invention disclosed in concurrently filed U.S. patent application, application Ser. No. 09/227,643, entitled "Increasing Speed of Non Error-Corrected Fax Transmissions" with Neil Joffe being the inventor thereof and filed on Jan. 8, 1999, the disclosure of which is incorporated herein by reference as though set forth in full.

Figure 1:
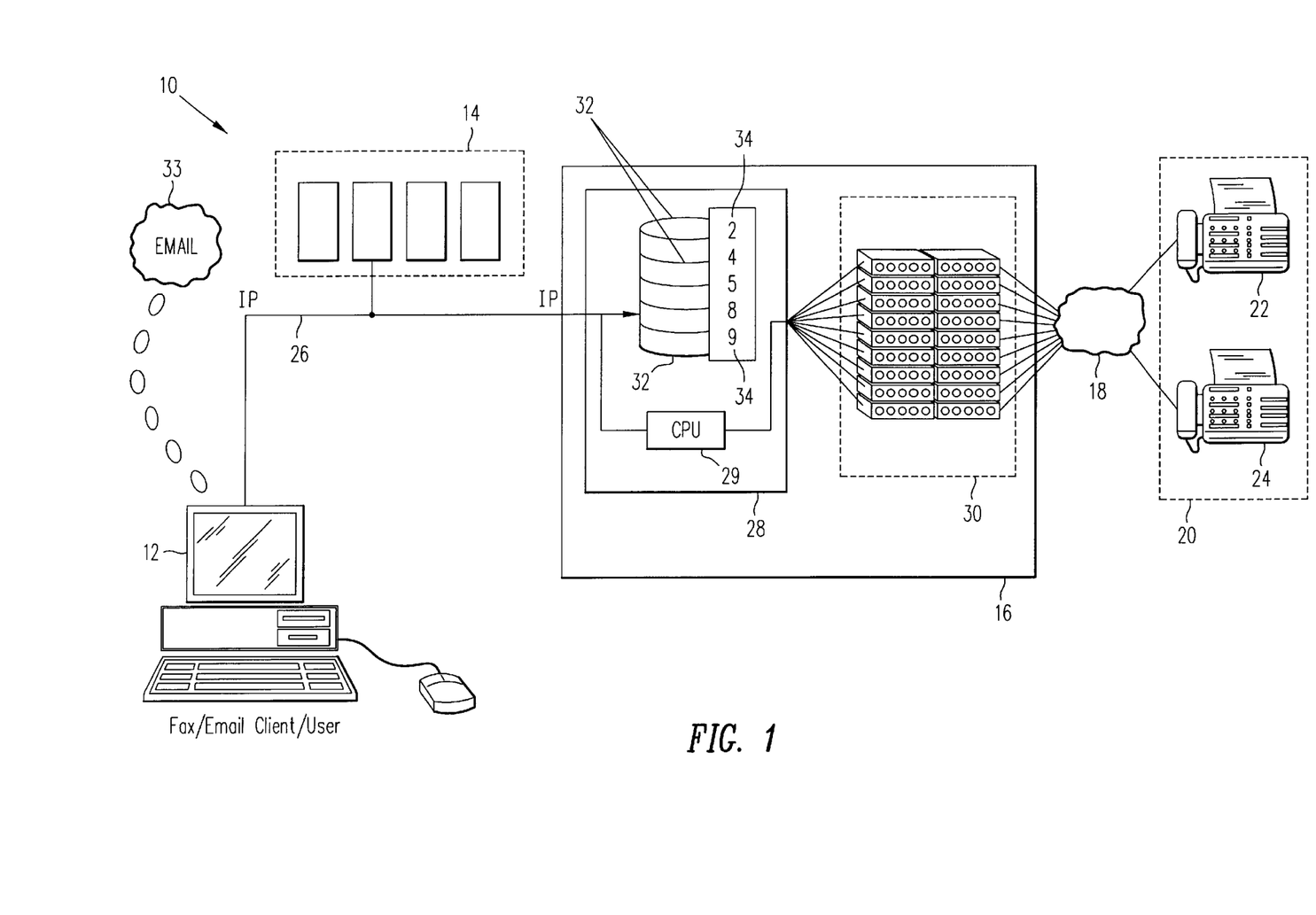
FIG. 1 shows, in conceptual general form, a fax broadcasting system including a networking equipment in accordance with a preferred embodiment of the present invention.

Referring now to FIG. 1, a fax broadcasting system 10 is presented in accordance with an embodiment of the present invention. The fax broadcasting system 10 is shown to include a sending communications device 12, such as a Personal Computer (PC) or a fax machine, for sending fax information to a host server device 14, which identifies, stores and transfers the information sent by the communications device 12, to a networking device 16 for processing of the fax information.

The networking device 16, which may be a network router device, then transfers the processed information through telephone company (telco) transmission lines 18, to a plurality of receiving communication devices 20, which receive the processed information and format the same for use by users of the communications devices (users are not shown in FIG. 1). The plurality of communication devices 20 comprise individual communications devices 22 and 24. While two such devices, 22 and 24, are depicted in FIG. 1, in alternative embodiment, there may be a different number of such devices. Moreover, the devices 22 and 24 may be in the form of fax machines, PCs or any other kind of communication device that is capable of receiving fax transmissions.

The communication device 12, which in alternative embodiments may be a fax machine or other communications devices capable of transmitting fax information, is coupled to the host server device 14 through a communication interface 26 for transferring digital information, such as the email message 33 including fax information, thereto.

The communication interface 26 is used for coupling information in a format or protocol adopted and recognized by the industry at-large, referred to as the Transmission Control Protocol/Internet Protocol (TCP/IP). This standard is viewed as a 'layer' within the 'layers' of the Internet communication structure. In fact, a typical use of the fax broadcasting system 10 of FIG. 1 is the Internet environment, which is a digital networking environment using packet switching network protocols for transferring information, generally in digital form, between various types of communications and/or computer equipment.

Routers, such as the one shown in FIG. 1 as an example of the networking device 16, are commonly employed to direct the flow of data over networks, such as the Internet. In FIG. 1, the networking device 16 includes a processing device 28 coupled to a modem bank 30. The processing device 28 receives information that is originally sent by the communications device 12, through the host device 14, processes the same for use by the modem bank 30, which in turn, transfers digital information, such as fax messages, in the form of packets, to the plurality of communication devices 20.

The processing device 28 includes a Central Processing Unit (CPU) 29. The CPU 29 executes a software program, the binary version of which is stored in a memory device (not shown) also included within the processing device 28, for processing and transferring messages sent by the communication device 12 to the modem bank 30.

In operation, an electronic mail (email) message 33 is transferred from the communications device 12 to the host device 14, through the communication interface 26. The email message 33 has attached thereto (not shown) fax information. This fax information is typically in the form of a TIFF file. For example, in the case where the communications device 12 is a PC that is connected to the communication interface 26 either via modem or directly though Local Area Network (LAN), a user of the PC may wish to fax information to another user(s). This is performed by sending an email message having fax contents, generally in the form of a TIFF file, attached thereto. The email message 33 therefore includes the data that is being transmitted as a fax transmission as well as header information, which identifies the type of data being transmitted. For example, a fax transmission may be identified in the header of the email message 33 as '5555' (in hexadecimal notation).

The email message 33 is then received by the host device 14 where it is identified by its respective header information as a fax transmission and transferred thereafter to the networking device 16. It should be noted that the email message 33 is transferred in packet form from the communications device 12 to the networking device 16. That is, the message is broken up into portions or packets, which are transferred sequentially. These packets are received sequentially by the networking device 16. As each packet is received by the networking device 16, it is stored in a particular storage space, or buffer 32, for transmission thereof to one or more communication devices with fax capability. Each of the numbers (in FIG. 1) appearing next to a respective one of the storage spaces 32 represents a reference count 34 for use in indicating the number of communication devices that are yet to receive the respective packet, as will be described in further detail with respect to other figures. Storage spaces 32 may be comprised of Random-Access-Memory (RAM) type of memory.

It should be noted that the email message 33 need not be provided to the networking device 16 by the communications device 12 and the host device 14. Rather, an email having fax information included therein may be generated and transferred to the networking device 16 by any apparatus that is capable of doing the same. For example, in other embodiments, another networking device, or router could be used to perform this function. Other alternatives include fax machines having email capability, Internet fax machines, or any other such devices that is capable of transmitting an email message including fax contents, which is in the form of a TIFF file.

It should further be noted that in the system of FIG. 1 and in accordance with an embodiment of the present invention, while multiple recipients of the fax information being transmitted receive this fax information, only one email message 33 is sent through the communication interface 26 to the networking device 16 thereby reducing the traffic through the communication interface 26 and increasing throughput thereof. This also reduces costs to the users of the fax broadcasting system 10 who must pay toll charges for the time period associated with their accessing the communication interface 26.

The networking device 16 is capable of broadcasting a single copy of fax message packets received from the communications device 12 to multiple fax machines (or communications devices) without making multiple copies thereof. That is, one copy of as many packets of a single fax message, i.e. as it is included in the email message 33, that the fastest fax recipient is capable of receiving, is stored in the processing device 28. Each such packet is stored in one of the packet storage spaces 32 of the processing device 28, as described above.

As each packet is received and stored accordingly, it is transmitted through the bank of modem devices 30 and the transmission lines 18 to various fax machines of the plurality of communication devices 20 for use by various users. Based upon the number of physical telephone lines included within the transmission lines 18, fax data may be simultaneously transferred to the devices 20. The transmission lines 18 are typically a T1 type of communications link carrying information in a Time Division Multiplexed format. The networking device 16 appends the received packets of fax information for transmission thereof by the modem devices 30 through the transmission lines 18 to the communication devices 20.

Each of the plurality of communication devices 20, such as the devices 22 and 24, may be of a different kind of device having various specifications for reception and transmission of information. For example, generally one of the specifications that identifies a particular fax machine is referred to as minimum scan line time defining the minimum amount of time required between the end of reception of a line of information and the reception of the next line of information. In older fax machines, this minimum scan line time tended to be longer whereas in more recently-developed fax machines, the minimum scan line time is much smaller or near zero. It should be noted that while some fax machines are characterized as having 'zero' minimum scan line times, their minimum scan line time is not actually exactly zero but close to it by milliseconds (ms), such as 5 ms or 10 ms.

Irrespective of the minimum scan line time however, the networking device 16 is able to transmit a fax message to various types of fax machines using only one copy of the fax message, as will be explained with reference to other figures hereinbelow.

Since one copy (or not all of the packets) of the information being faxed is kept within the networking device 16, there is very little storage space (be it hard disk, flash memory or other storage media) necessary for this purpose. That is, the amount of storage space necessary for storing the fax data is dictated by the size of the message being transmitted. This is important in that memory in the form of Dynamic Read Access Memory (DRAM) or Static Read Access Memory (SRAM) may be used for storage thereby eliminating the need for hard disk or other mass storage media thereby effectuating substantial cost savings.

Moreover, the present invention substantially improves the performance of fax broadcast systems such as depicted in FIG. 1 in that packets of information are continuously being transmitted from one source (i.e. the communication device 12) to various fax recipients (i.e. communication devices 20) even when one or more of such fax recipients are busy and cannot accept receipt of further fax information. That is, in the event one of the devices 22 or 24 is busy or becomes disconnected or inoperational for some reason, fax information is nevertheless sent to other operational (or non-busy as the case may be) fax recipients. This concept will be further clarified with respect to a flow chart figure described hereinbelow.

Figure 2:
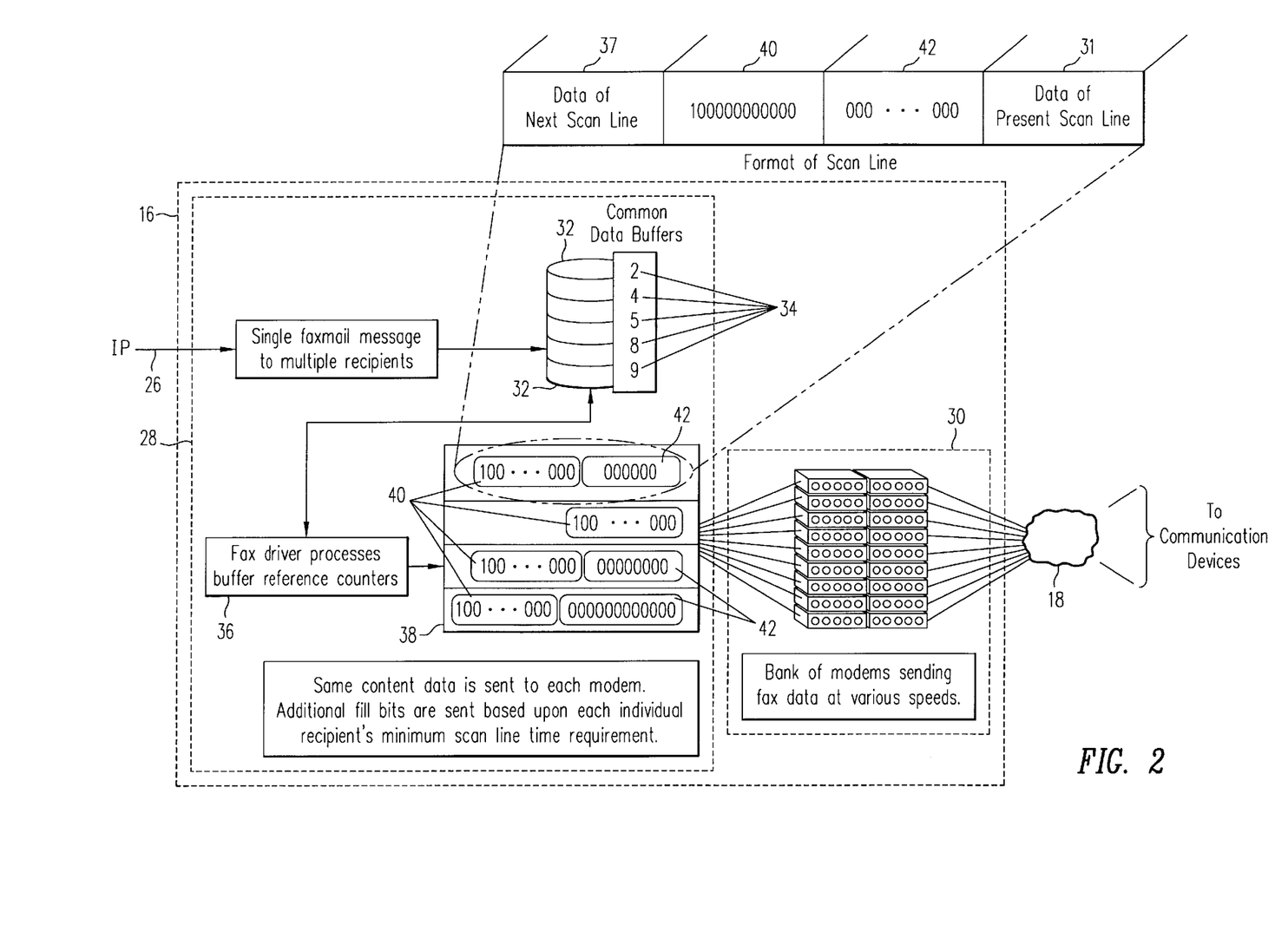
FIG. 2 illustrates more details of the networking device 16 of FIG. 1 in accordance with a preferred embodiment of the present invention.

In FIG. 2, there is depicted further details of the networking device 16 in conceptual form. An email message with a fax file (in, for example, the form of TIFF) attached thereto is coupled onto the communication interface 26, in packet form, for use by the networking device 16 as discussed above. Each packet of the received message, as it is received sequentially with respect to the remaining packets of the message, is stored in a corresponding packet storage space 32. As earlier noted, as many packets as are needed for transmission to the fastest fax machine recipient are stored in various packet storage spaces, each packet being stored in one of the packet storage spaces 32. With each packet, there is designated and stored a reference count representing the number of fax recipients that are yet to receive the particular packet.

In FIG. 2, the reference count 34 for all of the packets are shown vertically starting from the top as '24589'. This indicates that the first packet, or the packet stored in the first packet storage space 34 from the top has associated therewith a reference count of '2' indicating that this particular packet is to be transmitted two more times to two different fax machines. The next reference count 34 is shown as '4', which indicates that four other recipients of that packet are yet to receive this particular packet and so on. One of the reasons why each packet would have associated therewith a different reference count number is that each fax machine or recipient (for example, the two devices 22 and 24 in FIG. 1) may receive information at a different speed. Since packets may be transmitted simultaneously to various fax recipients and as each different type of fax recipient takes a different amount of time to receive the information, each packet will have a different reference count number associated therewith.

As indicated earlier, when a packet is transferred out of its storage space 32 to one of the plurality of communication devices 20, the reference count, which is developed by a counter within the block 36, is decremented by one. The block 36 represents, in conceptual form, the structure that includes the reference counters and the processor 29 (shown in FIG. 1).

A fill bit generator block 38 is shown to represent the structure for generating fill bits. Fill bits are included in fax transmissions along with the fax data that is attached to an email message. Fill bits, which are typically comprised of a number of '0's, are appended to the end of a fax scan line for transmission thereof to the plurality of communication devices 20 through the modem bank 30. As noted earlier, each type of fax machine may have associated therewith, a different minimum scan line time requirement. Accordingly, the longer the requirement for the minimum scan line time, the greater the number of appended fill bits associated with each fax scan line.

In FIG. 2, the block 38 shows four different scan lines being transmitted to the various communications devices. Each of the scan lines in FIG. 2 is shown to include at least one end-of-scan line field 40, which typically comprises eleven '0's followed by a '1', or the code '100000000000'. The end-of-scan line field 40 obviously indicates completion of one scan line transmission. Some scan lines are shown to further include a fill bit field 42. For example, the top scan line of the block 38 is shown to include a fill bit field 42 having six '0's and an end-of-scan line field 40. The second scan line from the top does not include a fill bit field whereas the next two scan lines include fill bit fields 42 each having eight and twelve '0', respectively. The different lengths of fill bits 42 for each of the scan lines accommodate the different minimum scan line requirements for each of the communications devices receiving the scan lines.

In FIG. 2, an expanded view of the format of a scan line is shown. A scan line generally includes a data field of the present scan line 31, the fill-bit field 42, the end-of-scan line field 40 and a data field of the next scan line 37. It should be noted that the data fields 31 and 37 are transmitted to the modem bank 30 with the latter receiving and sending the same at different speeds corresponding to the speed of the fax machines receiving the data. This is perhaps best understood using a couple of examples.

Figure 3:
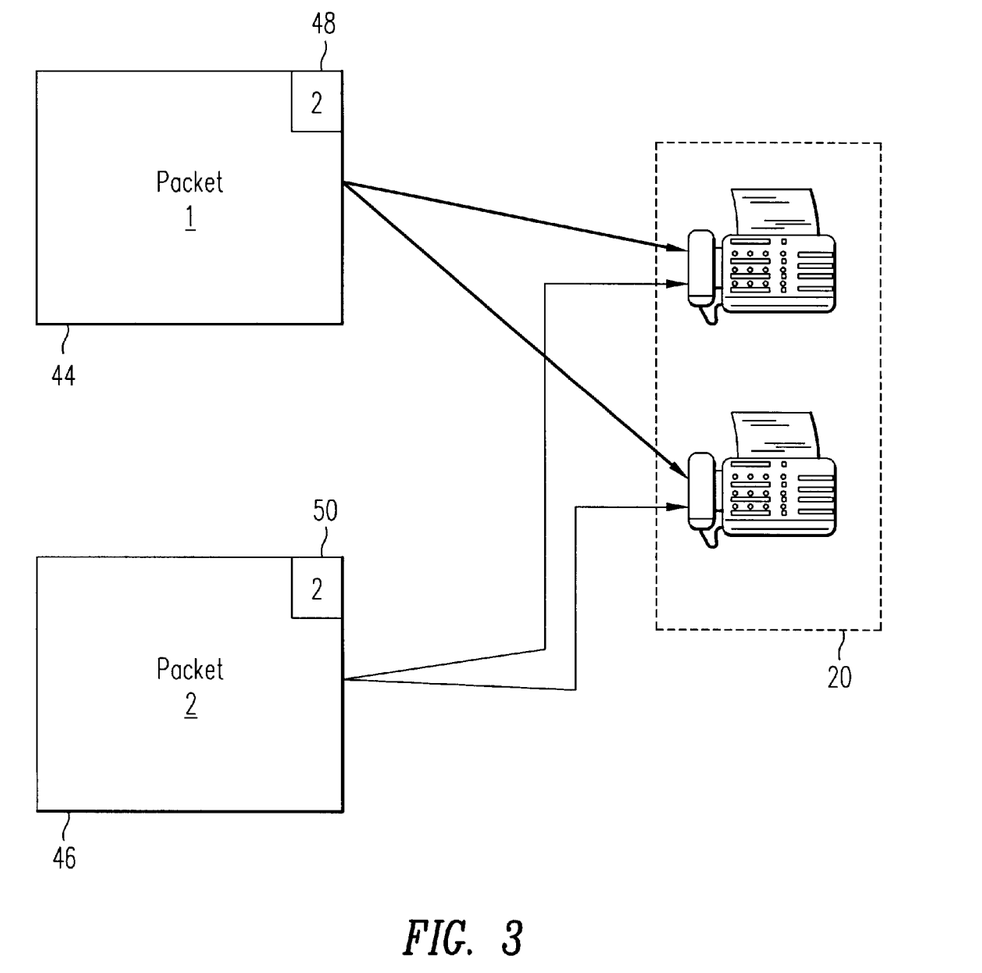
FIG. 3 depicts, in conceptual form; an example of transmission of two packets by the networking device 16 of FIGS. 1 and 2.

FIG. 3 shows, in conceptual form, an example of two packets, 44 and 46, that are a part of the same fax message for transmission to the fax machines included in the plurality of communication devices 20. Each of the packets 44 and 46 have associated therewith a reference count 48 and 50, respectively, which indicate the number of recipients of the packet. In this example, this number is '2' indicating that two fax machines will be receiving the packets 44 and 46. If packet 44 is sent to both of the fax machines in the plurality of communication devices 20 simultaneously, the reference count 48 is decremented to the value '0'. If alternatively, the packet 44 is sent to one of the fax machines before it is sent to the other fax machine, the reference count 48 is decremented to the value '1' in between transmission of the packet 44 to the first and the second fax machines. Packet 46 may be transmitted to the plurality of communication devices 20 in the same manner. The order in which these packets are transmitted and whether or not they are transmitted simultaneously is, in part, based upon the number of modem devices within the modem bank 30 (in FIG. 1) as well as the number of transmission lines within the transmission lines 18 (in FIG. 1).

Figure 4:
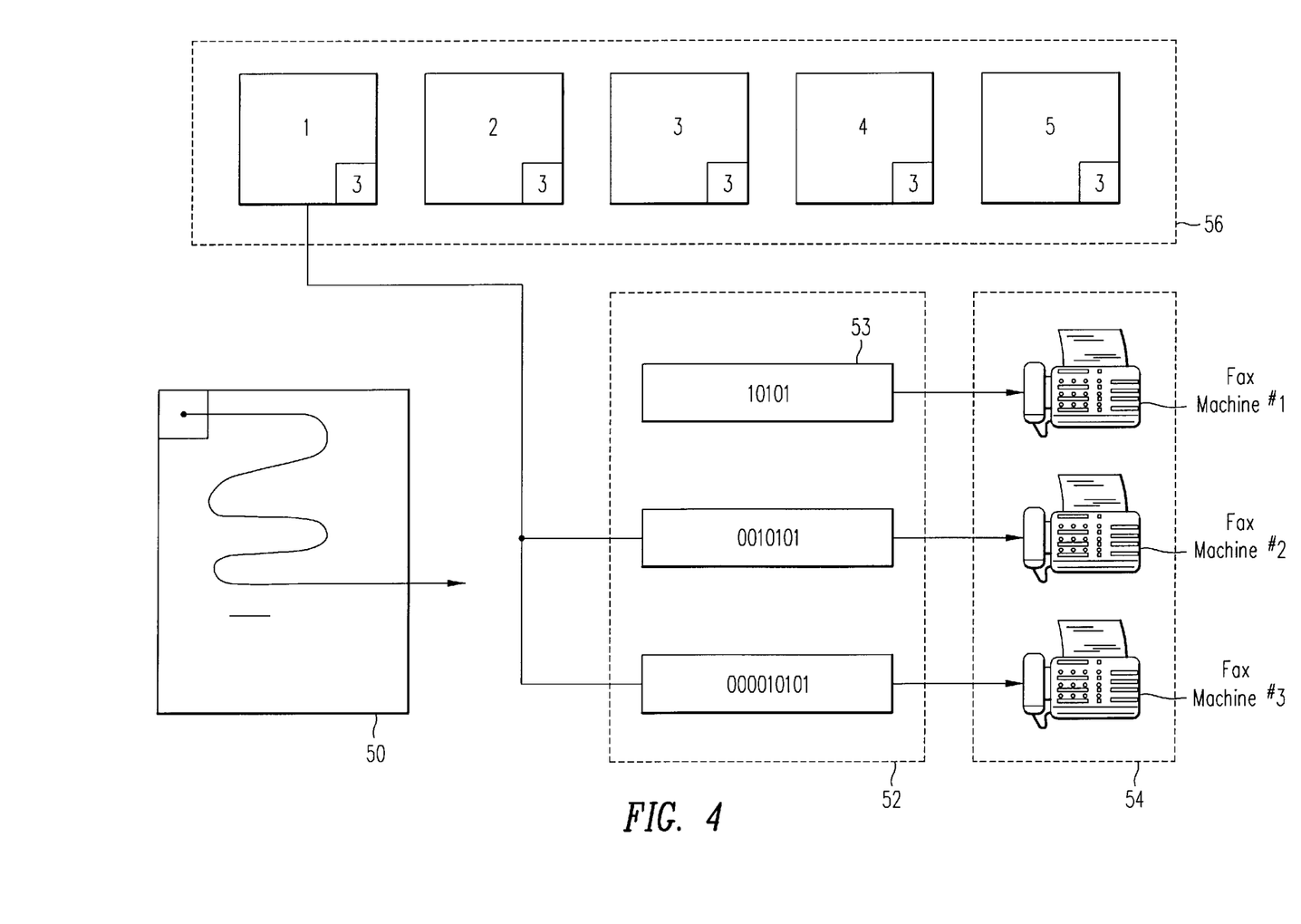
FIG. 4 illustrates another example of transmission of packets of information by the networking device 16 of FIGS. 1 and 2.

FIG. 4 shows, in conceptual form, yet another example of transmission of fax information. A plurality of packets 56 includes five packets that make up a fax transmission, which is to be sent from an email user (not shown) to three different fax machines 54. As is noted above, an embodiment of the present invention allows such a transmission to be performed simultaneously to the three fax machines 54. Each of the packets of the plurality of packets 56 have associated therewith a reference count which is shown as '3' because there are three fax machines that will be the recipients of the five packets. If however one or more of those fax machines fails or has failed to operate appropriately due to being busy, out of paper, or for various reasons inoperational, the reference count is adjusted, as discussed above with reference to FIG. 3, to represent a value lower than the value '3' depending upon the number of fax machines that are inoperational.

Memory space 50 is shown in FIG. 4 for storing a packet of information with each packet including 1500 bytes or less of information. Memory space 50 is shown in FIG. 1 as the storage space 32. The first packet that is received from the email user is labeled as packet 1 in FIG. 4 and it will be the first to be sent to the three fax machines 54.

As will be explained in further detail with respect to the steps outlined in FIG. 5, after the fax machines 54 have been checked for a lack of transmission failure, the transmission of packet number 1 is begun to the first fax machine or fax machine number 1.

In FIG. 4, information pertaining to portions of three scan lines are shown. The data of the first scan line from the top that is sent to the fax machines 54 is indicated at 53 as the binary value '10101'. A temporary storage space 52 is used to store the bits that are transmitted through the modem bank 30 (not shown in FIG. 4) to the fax machines 54. Temporary storage space 52 is typically included in each of the modems of the modem bank 30.

Throughout the transmission of fax information to fax machines, transparency bytes are sent among the other types of fax information discussed above. The inclusion of transparency bytes are required pursuant to the protocol used by the industry defining the format for transmission of fax information, as understood by those skilled in the art. While fill bits are sent at the end of a scan line, transparency bytes are sent throughout the transmission of a packet of information.

In the example shown in FIG. 4, no fill bits are necessary to accompany the data 53 that is sent to the first fax machine. While the first packet of information is being sent to the first fax machine, the same packet is also being sent to the second fax machine and the third fax machine. In the case of the second fax machine transmission, fill bits in the form of '00' are added to the scan line information to compensate for the minimum scan line time requirement of the second fax machine. Similarly, in the case of the third fax machine transmission, fill bits '0000' are added to the data to compensate for the minimum scan line requirements of the third fax machine.

Once packet 1 is sent to all three fax machines, the space that it occupies in memory (its storage space 30) is made available because that particular packet is no longer needed for storage. Additionally, each time the transmission of a particular packet such as packet 1 to a fax machine is completed, its corresponding reference count is decremented by one.

In the situation where the transmission of an entire packet cannot be completed continuously the position where the last transmitted information within the packet was sent is preserved and an interrupt is awaited before transmission of the remainder of the packet begins for that particular fax machine. Reasons for not completing the transmission of an entire packet include, inter alia, lack of an entire packet worth of temporary memory space 52. That is, in one embodiment of the present invention, the data included in a packet is 1500 bytes. However, the addition of the fill bits, if necessary, end-of-scan line field and transparency bytes, increases the size of the information included within a packet to more than 1500 bytes which may in fact, exceed the size of the temporary storage space. Alternatively, the temporary storage space may be less than 1500 bytes in size and therefore incapable of storing an entire packet of information where a packet is 1500 bytes in size. In other words the ability to send an entire packet of information is, in part, a function of the size of the temporary storage space that is being employed for storing a packet of information including the transparency information, the requisite fill bits and so forth.

Figure 5A:
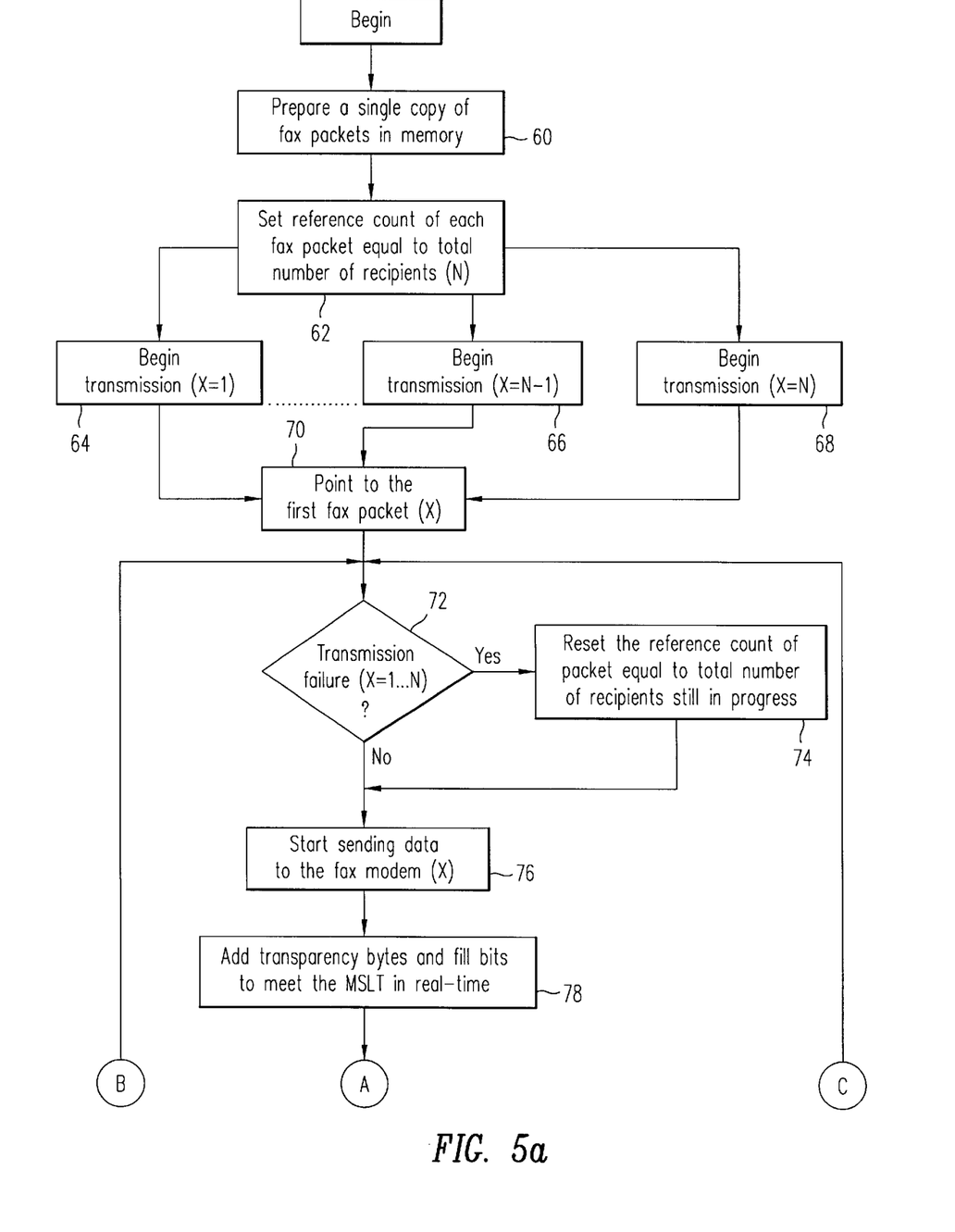
FIGS. 5a and 5b show a flow chart of the steps performed by the networking device 16 of FIGS. 1 and 2.
Figure 5B:
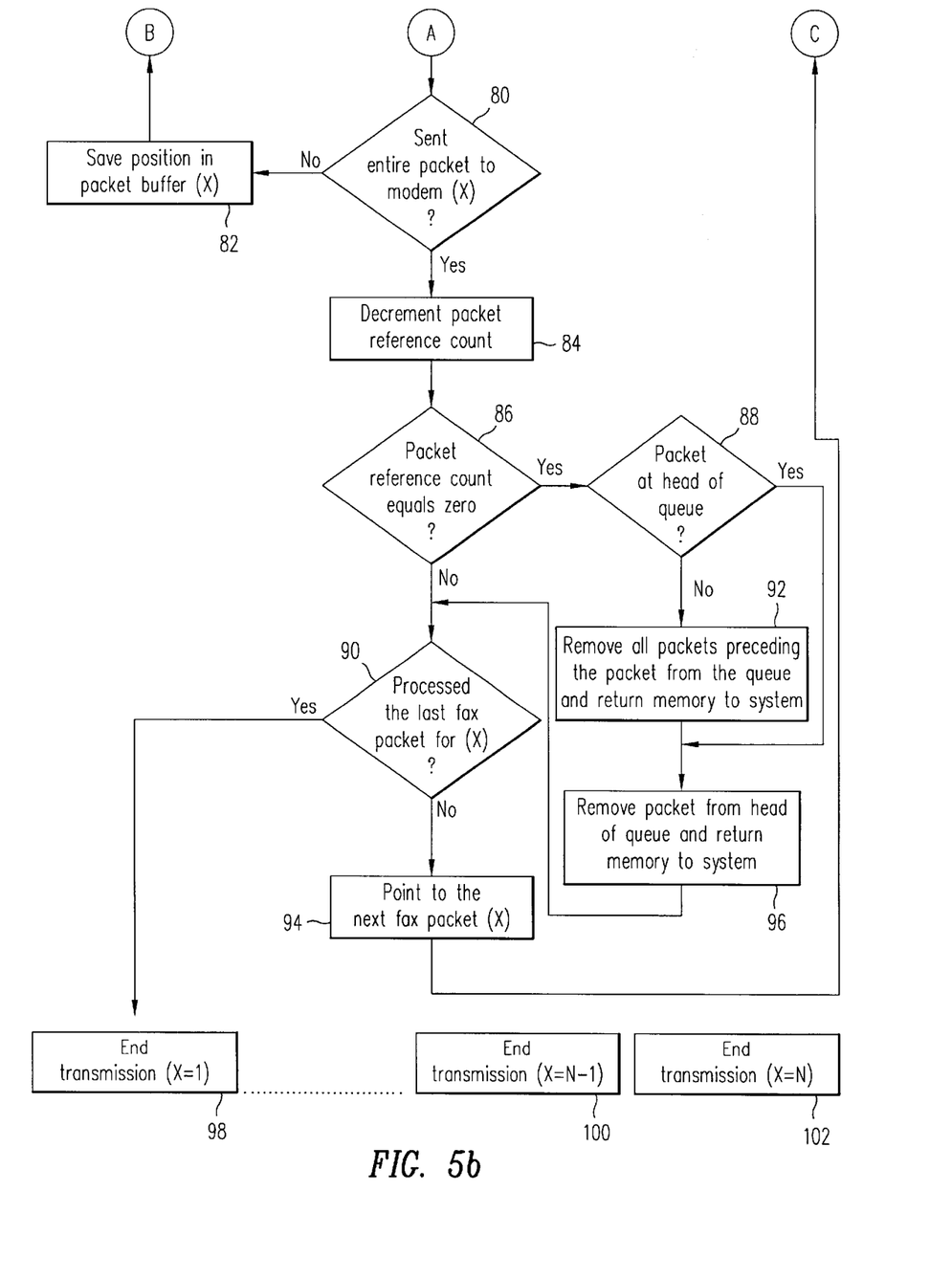

FIG. 5, which is comprised of FIGS. 5*a* and 5*b*, shows a flow chart of the steps performed by the fax broadcasting system 10 (in FIG. 1) for transmitting fax information. In the interest of further clarification, these steps will be described in conjunction with the apparatus presented in FIGS. 1 and 2.

In FIG. 5*a*, at step 60, a packet of a fax message, as attached to an email message and coupled onto the communication interface 26 (in FIG. 1) is received by the networking device 16 (in FIG. 1) and a single copy thereof is stored in the storage space 32.

At step 62, the reference count 34 of the received fax packet is set to a value representing the number of recipients of the fax message. For example, if there are five fax recipients of the plurality of communication devices 20, the reference count 34 pertaining to the received fax packet is set to the value '5'. At this time, transmission of the fax packet information to each of the fax recipients starts at steps 64–68 with 'N' representing the number of fax recipients in FIG. 5a. It should be noted at this time that the steps outlined in FIG. 5 are generally performed by the CPU included in the processing device 28 by executing software code from memory that is also included within the processing device 28.

The beginning of transmission to the fax recipients, at steps 64–68, involves assigning modem devices from the modem bank 30 for transmission of a particular packet to a particular one of the N fax recipients. A modem device is assigned for transmission to a fax recipient at the time a fax call is being made (before the caller dials out) and the modem devices are so assigned in a sequential fashion to the fax recipients. Speeds of modem devices, which are those commonly, available in the industry, within the modem bank 30 may be 14.4 kbaud, 19.9 kbaud, 2800 baud, 7200 baud or 33.6 kbaud or other speeds associated with commercially-available modem devices.

In the embodiment shown in FIG. 1, the modem bank 30 includes 120 modem devices although alternatively, other number of modems may be included in the modem bank 30.

Additionally, at steps 64–68, the fax recipients are set-up to receive information. This involves initialization requirements unique to each type of fax machine within the plurality of communication devices 20.

At step 70, a pointer is set to point to the first fax packet of the fax message, which is stored in one of the storage spaces 32. Next, at step 72, each of the recipients of the fax message is checked for transmission failure. If no such failure is detected, at step 76, the fax packet data is transmitted from the respective storage space 32 to one of the fax recipients.

At the end of the data within a fax packet, at step 78, fill bits and the end-of-scan line code (as earlier noted, the end-of-scan line field which includes and the end-of-scan code, identifies the end of the particular scan line being transmitted to the recipient of the fax information) are sent to the recipient of the fax packet data (the fax modem (x) at step 76 of FIG. 5a). Throughout the transmission of a packet of information, transparency bytes are also transmitted. Fill bits are those discussed earlier with respect to FIG. 2 comprising of a variable number of zeroes based upon the type of fax recipient receiving the packet.

Next, at step 80, the packet of information is checked for successful transmission thereof to the fax recipient. If the entire packet has been sent, the reference count 34 is decremented by one. The size of a packet is approximately 1500 bytes although other sizes of packet may be employed without departing from the spirit of the present invention.

To place a packet size into perspective, a fax page is typically on the order of 40 k bytes in size thus comprising 24 packets. In the present invention, to maintain high system performance, the transmission of a packet of information may be interrupted and transmission of another packet is consummated. This effectuates continuous transmission of information to the various fax machines receiving the fax transmission since some fax machines may be slower than others and may not be able to keep up with rapidly-transmitted information. This coupled with the storage of only one copy of the fax transmission make for a real-time transmission of fax information to various fax machines. That is, fax information is continuously being transmitted to one of the plurality of the fax devices despite the speed differences in the fax devices and even despite the inoperatability either at times or permanently of certain fax devices. Additionally, only as many packets of a fax message as can be received by the fastest fax device recipient is maintained within the networking device 16.

At step 86, the reference count 34 is compared to the value zero and if it is not equal to zero, which means that the same packet of information needs to be sent to other fax recipients. At step 90, there is a determination made as to whether the fax packet being transmitted to the current fax device recipient is the last packet of the fax message. If the packet is not the last packet, the process continues to step 94 where the same pointer that was used at step 70 (in FIG. 4a) is now caused to point to the next fax packet for transmission and thereafter, the same sequence of steps as recited above, starting with step 72 through step 94 are repeated.

Referring back to FIG. 5a, if at 72, a transmission failure is detected, the reference count 34 is set to a value representing the total number of fax recipients minus the number of fax recipients that have transmission failures. The process then resumes at step 76.

In FIG. 5b, at 80, if the entire packet is not transmitted, for example, in the case where the temporary storage space is less than the total number of data bytes, fill bits and transparency bytes of a packet, the position of the last data within the packet being transmitted is preserved. This would be a position within the packet's storage space 32 and the process resumes at 72 upon receipt of an interrupt indicating that the next packet is ready for transmission.

Essentially, every time a fax recipient is ready to receive further packets of information, there is an interrupt sent to the CPU of the processing device 28 to so indicate and execution of the program is resumed starting from 72 (in FIG. 5a).

In FIG. 5b, if at 86, the reference count 34 is zero, i.e., there are no more fax recipients of this particular packet in that all recipients have now received the packet or aborted reception, this particular packet of information can be deleted or removed from the storage space 32 thereby resulting in a portion of memory becoming free or available for further use. But before that is done, or some time thereabouts, at 88, it is determined whether the packet whose reference count at 86 was determined to be zero, or the packet that was just transmitted, was at the head of the queue (the packet that is at the head of the queue is the first packet to be stored in one of the storage spaces 32 among the plurality of packets that are stored in the storage spaces 32) and if not, at step 92, the storage space 32 associated with any packets ahead of this packet is made available.

Figure 6:
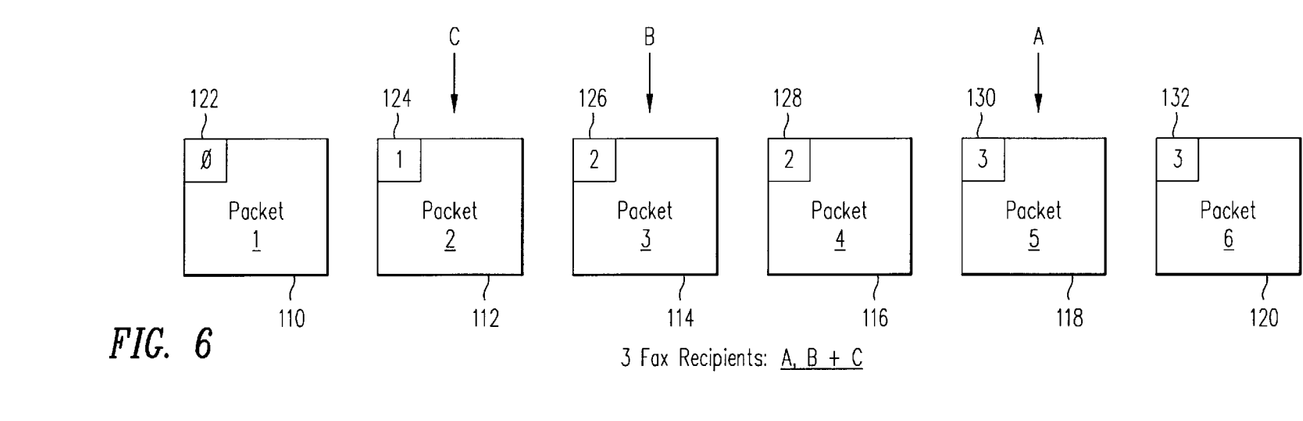
FIG. 6 illustrates an example of transmission of packets of a fax message to various fax recipients in accordance with an embodiment of the present invention.

This is perhaps best understood by explanation of an example, as shown in FIG. 6. In FIG. 6, six packets, 110–120 are being transmitted to three fax device recipients labeled A, B, and C (not shown). Each packet has associated therewith, a reference count. Reference counts 122–132 are respectively associated with packets 110–120.

These packets are in an order representing the sequential order of information belonging to a particular fax message. These packets are accordingly transmitted sequentially. That is, the first packet 110 will be transmitted first followed by the second packet 112 and the third packet 114 and so. As noted earlier, each packet is transmitted simultaneously to the three fax machines. The completion of transmission of each packet does not necessarily occur in a sequential order with respect to the packet numbers because the order in which the transmission of each packet is completed is a function of the speed of the individual fax machine recipients.

For example, if the second fax machine is much faster than the first, transmission of the first packet to the second machine will be completed sooner than the completion of the transmission to the first fax machine.

In FIG. 6, the fax recipient A is the fastest machine (operating at 14.4 kbaud), the fax recipient B is the next fastest (operating at 7200 baud) and the fax recipient C is the slowest of the three recipients (operating at 4800 baud). FIG. 6 shows a snapshot of how far along transmission of the fax message is to the recipients A, B and C. Since A is the fastest machine, it is shown to be receiving the fifth packet or packet 118 while fax recipient B is shown to be receiving the third packet or packet 114 and fax recipient C is shown to be receiving the second packet or packet 112. According to their respective reference counts, recipients B and C have not received the packet 118 while recipient A has received the packet 114, recipients A and B have received the packet 112, all recipients have received the packet 110, no recipient has received packet 120 and only recipient A has received the packet 116. Since the packet 110 has been received by all recipients A, B and C, it will be deleted from its corresponding storage space 32 (shown in FIGS. 1 and 2).

In the event the fastest fax recipient, in this case A, fails or becomes inoperational for some reason (by way of being busy, out-of-paper, disconnected or the like), the reference count pertaining to all of the packets are modified to reflect one less recipient.

However, if the slowest fax recipient becomes inoperational, in this case recipient C, there needs to be a way of having the reference counts adjusted to reflect this condition. This condition is particularly difficult to detect since both recipients A and B have already received the packet that C has yet to receive. This condition is detected in accordance with an embodiment of the present invention by checking the state of the reference count. That is, when C fails, the networking device 16 is so alerted and it causes the corresponding packet reference count 126 to be decremented by 1, to "1". The reference count 126 is decremented a second time, to "0", when the networking device 16 completes transmission of the packet to B. With respect to FIG. 5b, at 88, assuming the program is processing packet 114, i.e. transmitting this packet to recipient B, a determination is made of whether or not the packet 114 is at the head of the queue. The outcome of this determination is clearly 'no' since the packets 110 and 112 precede the packet 114.

Nevertheless, since C has failed to receive the packet 112 while other recipients have successfully received the same, the packet 112 is deleted or removed from its corresponding storage space 32. In other words, if the slowest recipient (in this case C) fails, the next to the slowest recipient (in this case B) alerts the networking device to delete the packet that has been received by all other than the inoperational recipient, i.e. packet 112. This is done even though packet 112 is not at the head of the queue, as indicate at step 92 of FIG. 5b.

Thereafter, at step 96, the packet that is at the head of the queue (in FIG. 6, this would be packet 110) is deleted or removed and its corresponding storage space 32 is made available for use. In this respect, as packets are deleted more rapidly, valuable packet storage space is made available more rapidly and used for receipt and transmission of more packets more expeditiously. This in turn increases the overall throughput of the system.

It should be noted that there are two ways of handling deletion of packets in the manner described above. That is, with respect to FIGS. 5b and 6, at steps 92 and 96, either all of the packets preceding packet 114 can be deleted or alternatively a portion of or even just one of the preceding packets may be deleted. It is the inventors' experience however, that deletion of all packets preceding packet 114 is preferable in that more memory space is made available for use.

A fax message is typically sent in packets that represent the sequential order of information contained in the fax message. A user expects to see the information that appears at the beginning of the fax transmission, i.e. fax cover sheet or the first page of the cover sheet first followed by the remainder of the information in order. Moreover, each packet is of the same size, be it 1500 bytes or otherwise. The status of the reference count of each of the packets determines which packets will be removed or deleted with their respective storage spaces becoming available for use in storing other packets. Essentially, those packets that have associated therewith, a reference count of '0' will be deleted. Accordingly, the present invention allows very efficient use of the memory space that is needed to store packets of information.

In FIG. 5b, at 90, if it is determined that the last packet has been processed, the transmission for that particular packet ends at 98, 100 or 102. Upon the completion of transmission of a fax message and all of its associated packets, the packet storage spaces 32 (in FIGS. 1 and 2) are cleared of all packet information if they have not so been cleared in steps 92 and 96 of FIG. 5b.

Referring back to FIG. 1, when an email message 33, having a fax TIFF file attached thereto, is received by the networking device 16, the email message is stripped of its email contents in realtime. The TIFF file is then converted to a fax image by the networking device 16 prior to transfer of the fax to the communication devices 20. This is performed by execution of the software program residing in the networking device 16. Although, optionally, these functions may be performed by hardware as is apparent to those skilled in the art.

Figure 7:
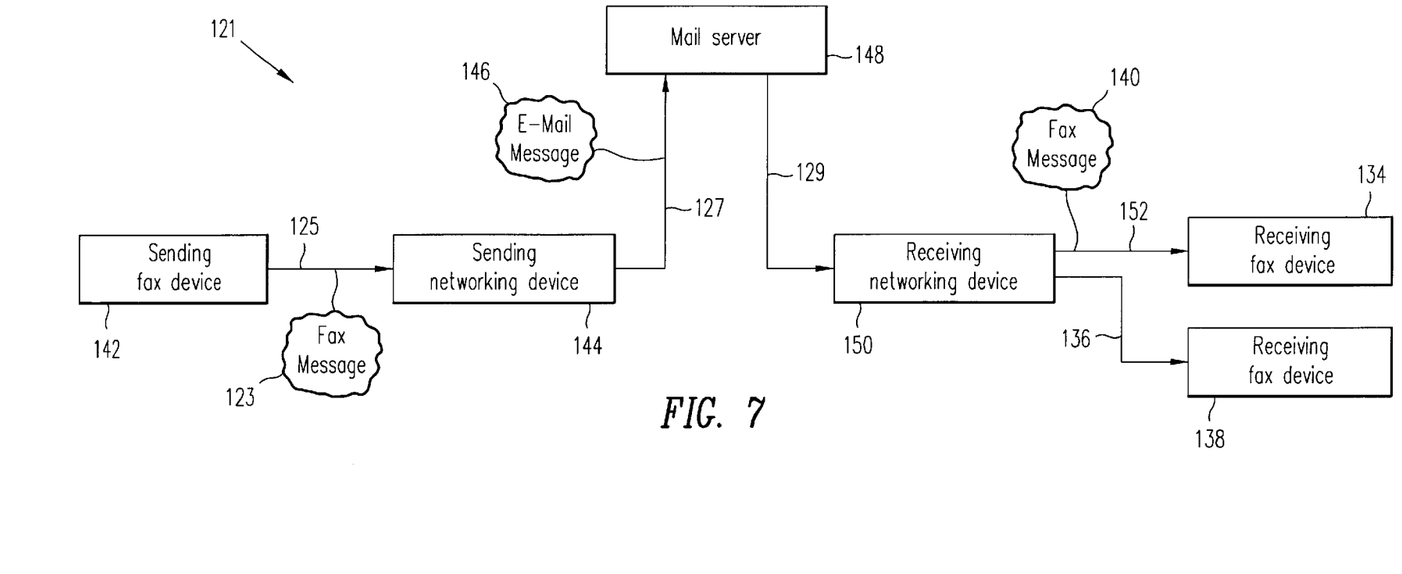
FIG. 7 shows a fax system in accordance with an alternative embodiment of the present invention.

In FIG. 7, a fax system 121 is shown in accordance with an alternative embodiment of the present invention. The fax system 121 is shown to include a sending fax device 142, a sending networking device 144, a mail server device 148, a receiving networking device 150, a first receiving fax device 134 and a second receiving fax device 138. While two receiving fax devices 134 and 138 are shown in FIG. 7, alternatively, one or more fax devices may be employed without departing from the scope and spirit of the present invention.

The sending fax device 142 is coupled to the sending networking device 144 via a fax sending communication link 125 for transferring a fax message 123 therethrough. The sending networking device 144 is coupled to the mail server 148 through a mail server sending communication link 127 for transferring an email message 146 therethrough. The mail server 148 is further coupled to the receiving networking device 150 through the mail server receiving communication link 129. The receiving networking device 150 is coupled to the first receiving fax device 134 through the first fax communication link 152 and the second fax device 138 through the second fax communication link 136.

In one embodiment of the present invention, the networking devices 144 and 150 are router devices for use in network applications such as the Internet for determining the direction of and directing information to and from various communication devices such as fax devices 144, 134 and 138. The sending fax device 142 is a device that is capable of sending fax-formatted information and the receiving fax devices 134 and 138 are devices capable of receiving fax-formatted information. The fax device 142 may be either in close proximity to or typically remotely-located from the fax devices 134 and 138. The fax devices 134 and 138 similarly may be either located close to one another or remotely-located with respect to each other.

The sending networking device 144 is responsive to the fax message 123 sent by the fax device 142 and transforms the same to the email message 146 for use by the mail server 148. The mail server 148, in turn, transfers the contents of the email message 146 to the receiving networking device 150, which transforms the email message back into a received fax message 140 for use by the fax devices 134 and 138.

Generally, the way in which two or more fax machine exchange messages is standardized by a T.30 protocol, known to those skilled in the art. Accordingly, the fax message 123 is sent through the fax communication link 125 by adhering to the T.30 protocol. A Call Subscriber Identifier (CSID) is also used as a standard for conveying the identity of the fax machine that is being contacted by the sending fax machine. The CSID is known to users of lax machines as the identification information, i.e. telephone number, appearing on the screen of a sending fax machine that identifies the receiving fax machine. For example, in FIG. 7, if a user dials the number '4085274877' for sending a fax message, this number preceded by '+1' (thus, the CSID being '+14085274877') is sent to one of the receiving fax devices 134 or 138 for identifying the same. The '1' part of the '+1' indicates that the call associated with the phone number is a U.S. or Canada phone number and the '+' indicates that the phone number is an international number. Therefore, having '1' only in front of the area code indicates that it is not a long-distance call whereas having a '+' in front of the '1' indicates that '1' is a country code with '1' in particular indicating U.S. or Canada and other values indicating the designation of other countries. The '+1', in the U.S., generally need not be programmed into a fax device whereas in Europe, the user programs the country code and '+'.

Additionally, information sent by the fax device 142 is organized in frames and a Transmitting Subscriber Identifier (TSI) frame is used to send information by the fax device 142. Similarly, a Call Subscriber Identifier (CSI) frame is used to receive fax information by the fax devices 134 and 138. These frames are also a part of a recognized standard for communication of fax information.

Email messages typically have a 'from' field that is comprised of two parts. The first part of this field, referred to as the 'friendly name' is used to identify the sender of the email message. For example, a user's name may be used in a 'from' field to identify the sender. The second part of the 'From:' field, or the 'email name', is recognized by devices handling the email message as an identification of the sender whereas the 'friendly name' is used by users of email messages.

When an email message, such as the email message 146 is created by the sending networking device 144, the identification information, or telephone number, of the sending fax device 142, including the area code preceded by +1 if the telephone number is a U.S. number, is used in the TSI frame as the first part (or friendly name) of the 'From:' field and the second part of the 'From:' field is then created. The second part of the 'from' field (or the 'email name') is commonly based on the friendly name of the TSI but need not be necessarily so. That is, to use the example provided above, while commonly the email name would be '4085274877', it may be designated as a name or other types of identification information.

The reason for the "From:" field of the TSI frame including the telephone number of the original sender is so that the last fax machine recipient is able to identify the original sender of the received fax message.

Therefore, the friendly name need not correspond to the email name and it is important to note that the TSI is not used to form the email name because the TSI frame is not necessarily reliable. An example of the latter is the case where a particular phone number having a particular area code is programmed into a sending fax device so that at the stroke of a specific key, the particular area code and phone number are used in the TSI frame. If the particular area code is later changed by the telephone company and the sending fax device is not re-programmed to reflect the modified area code, when a user punches the key that identifies the particular phone number, the particular area code instead of the modified area code will appear in the TSI frame. Similarly, if a sending fax device is re-located to a different area having a different area code and the programmed keys are not accordingly re-programmed to reflect the different area code, the TSI frame will include an incorrect identifier.

Accordingly, the proper email address or name is not derived from the TSI frame information, rather, it is derived from telephony parameters referred to as Automatic Number Identifier (ANI), commonly known as caller-id. The sending networking device 144 in FIG. 7, during performing the transformation of the fax message 123 to the email message 146, operates to derive the email name for the 'from' field from the ANI.

As the email message 146 is received by the receiving networking device 150, the email name is extracted from the 'from' field of the email message 126 and transmitted through the first fax communication link 152 or the second fax communication link 136 to one or more of the fax devices 134 or 138. The links 152 and 136 are also used to transmit fax data from the receiving networking device 130 to the fax devices 134 and 138. When the email message 126 is received by the receiving network device 150, the fax contents thereof is extracted and tranmsitted to at least one of the receiving fax devices 134 and 138. It should be noted that the first fax communication link 152 and the second fax communication link 136 communicate information in accordance to the T.30 standard. Accordingly, the fax device 142 communicates with the fax devices 134 or 138, the latter two being remotely located from the former through email (Internet), which may have traveled around the world prior to arriving at the fax devices 134 or 138. Stated differently, communication of fax information between sending and receiving fax devices is being effectuated without connecting the fax devices as commonly done where communication of fax information takes place in real time. Furthermore, displaying of fax device identification information is performed in the same manner as would be done if the fax devices were connected through common techniques.

The final destination of the email message 146, in FIG. 7, may alternatively be a user's electronic mailbox rather than the fax devices 134 or 138. That is, the receiving networking device 150 would be transferring the email message 146 to an electronic mailbox, in which case the CSID is viewed in the 'from' field of the received email message by the receiving user. If, on the other hand, the final destination of the email message 146 is a fax device, such as the device 134 or the device 138, the CSID is extracted from the email message by the receiving networking device 150 and sent to one of the fax devices 134 or 138 in the TSI frame as discussed above. The networking device 124 and 150 perform the functions stated above with respect to FIG. 7 by execution of software by the CPUJ (shown in FIG. 1). Alternatively however, the same may be implemented in hardware.

In FIG. 7, in accordance with the present invention, the fax devices 134 and 138 are caused to operate as if they are connected through circuit switching networks (such as conventional public networks) directly to the fax device 142 whereas they are not so connected and rather they communicate to each other through the use of email and packet switching network. More particularly, fax device coupling is being performed through the use of email by placing CSID information in the 'from' field of the email message, which is used to carry fax information between the fax devices. The CSID, as mentioned previously, is placed in the 'friendly name' of the 'from' field. In this manner, the CSID is transported reliably through email.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What we claim is:

1. A fax broadcasting system for use in a packet switching network environment for transferring facsimile (fax) information in the form of multiple packets, received from a sending communications device, to a plurality of receiving communications devices, operating at different speeds, comprising:

a router employed in the packet switching network environment to direct the flow of data over the packet switching network and for receiving, in packet form, an email message comprising fax information from said sending communication device, the fax information being received in packet form (packets of fax information), said router for transmitting the fax information to said receiving communications devices and comprising, a processing device having a plurality of storage spaces, each of said plurality of storage spaces for storing one packet of the fax information (a packet storage space), said processing device for receiving said email message, in packet form, having attached thereto fax information, in packet form, and upon receiving each fax information packet, storing only a single copy thereof in a corresponding one of said packet storage spaces and storing only as many packets of the fax information as can be received by the fastest receiving communications device and sending multiple copies of said stored packets of fax information, as fax messages, continuously and despite speed differences in the receiving communications devices and despite inoperability of any of the receiving communications devices, to said plurality of receiving communications devices, wherein no more than one copy of said fax information is stored for broadcasting the same to at least two receiving communications devices.

2. A fax broadcasting system as recited in claim 1 wherein said networking device further includes a modem bank coupled to said processing device for sending said stored packets of fax information to said at least two receiving communications device.

3. A fax broadcasting system as recited in claim 1 for use with a host server device coupled between the sending communications device and said networking device for receiving said email message and detecting the same to include fax information.

4. A fax broadcasting system as recited in claim 1 for use with a plurality of transmission lines coupled between said networking device and the plurality of receiving communications devices for transferring fax information therebetween.

5. A fax broadcasting system as recited in claim 1 further comprising more than two receiving communications devices.

6. A fax broadcasting system as recited in claim 1 wherein said networking device further includes a central processing unit (CPU) for receiving said email message and processing the stored fax information for use thereof by the plurality of receiving communications devices.

7. A fax broadcasting system as recited in claim 1 wherein said processing device further includes one or more reference counts, each reference count corresponding to a packet of stored fax information and for indicating the number of receiving communication devices that are yet to receive the corresponding packet.

8. A fax broadcasting system as recited in claim 7 whereupon completion of transmission of a particular packet of stored fax information, having a particular corresponding reference count, to the plurality of receiving communication devices, the particular reference count is decremented by one.

9. A fax broadcasting system as recited in claim 1 wherein said networking device is a router.

10. A fax broadcasting system as recited in claim 1 wherein the sending communications device is coupled to said networking device through a communication interface for transmission of the email message therebetween.

11. A fax broadcasting system as recited in claim 9 wherein the communication interface is further coupled to a host server device, the host server device for detecting the email message to have attached thereto fax information.

12. A fax broadcasting system as recited in claim 9 wherein the communication interface transmits the email message pursuant to a Transmission Control Protocol/Internet Protocol(TCP/IP) standard protocol.

13. A fax broadcasting system as recited in claim 1 wherein the fax information is in the form of a TIFF file.

14. A fax broadcasting system as recited in claim 1 wherein said processing device further includes a fill bit generator block for generating fill bits for being appended to the end of a fax scan line when the stored fax information is being transmitted to the plurality of receiving communication devices.

15. A fax broadcasting system as recited in claim 14 wherein each of the plurality of the receiving communications devices has associated therewith a corresponding minimum scan line time and prior to transmission of stored fax information to a particular receiving communications device, the number of fill bits being generated corresponds to the minimum scan line time asscociated with the particular receiving communications device.

16. A fax broadcasting system as recited in claim 1 wherein said processsing device operates to generate an end-of-scan line field for indicating the completion of a scan line transmission to the plurality of receiving communications devices.

17. A fax broadcasting system as recited in claim 1 wherein said processing device is adapted to generate and transmit transparency bytes throughout the transmission of the stored fax information to the plurality of receiving communications devices.

18. A fax broadcasting system as recited in claim 1 wherein upon sending one of said packets of fax information being stored in a particular storage space to all of the receiving communications devices, said processing device further for re-using the particular packet storage space for storage of other packets of fax information.

19. A fax broadcasting system as recited in claim 1 wherein upon sending one of said packets of fax information being stored in a particular packet storage space, to all of them receiving communications devices that are operational, said processing device further for removing from the particular packet storage space the stored packet of fax information thereby making the particular packet storage space available for further storage.

20. A fax broadcasting system as recited in claim 1 wherein said packet storage spaces are comprised of RAM.

21. A fax broadcasting system as recited in claim 1 wherein said networking device further includes one or more modem devices for converting said stored packets of fax information into the fax message prior to the transmission of the fax message to the receiving communications devices.

22. A fax broadcasting system as recited in claim 21 wherein the transmission of the fax message to the receiving communications devices is performed through a transmission line.

23. A fax broadcasting system as recited in claim 22 wherein the transmission line is of a T1 type of transmission line pursuant to an industry standard protocol.

24. A fax broadcasting system as recited in claim 1 wherein the fax messages sent to the at least two receiving communications devices are sent substantially simultaneously.

25. A method for communicating fax information using electronic mail (email) between a sending fax device and a plurality of receiving fax devices operating at different speeds, said sending and receiving devices being remotely located from one another, the sending fax device being coupled to a sending networking device for transmission of an email message having fax information to a receiving networking device being coupled to the plurality of receiving fax devices comprising:

receiving a fax message from the sending fax device for transmission thereof to the plurality of receiving fax devices;

in response to the received fax message, transmitting an email message having an email name for identifying the sending fax device, the email message comprising the received fax message;

receiving the transmitted email message;

extracting the email name and the received fax message from the received email message for transmission thereof to the plurality of receiving fax devices;

storing only a single copy of the received fax message;

storing only as many packets of the fax information as can be received by the fastest receiving communications device;

transmitting the email name and the stored received fax message to the plurality of receiving fax devices continuously and despite speed differences in the receiving fax devices and despite inoperability of any of the receiving fax devices, wherein the received fax message is communicated between the sending and the receiving fax devices in real time; and using the email name to identify the sending fax device.

26. A method for communicating fax information as recited in claim 25 further comprising upon transmitting the email name and the received fax message to the plurality of receiving fax devices, displaying the contents of the email name.

27. A method for communicating fax information using electronic mail (email) in a fax system between a sending fax device and a remotely-located user's electronic mailbox, the sending fax device being coupled to a sending networking device for transmission of an email message having fax information to a receiving networking device being coupled to the user's electronic mailbox comprising:

receiving a fax message from the sending fax device for transmission thereof to the user's electronic mailbox;

in response to the received fax message, transmitting an email message having an email name for identifying the sending fax device, the email message comprising the received fax message;

receiving the transmitted email message;

extracting the email name and the received fax message from the received email message;

storing only a single copy of the received fax message;

storing only as many packets of the fax information as can be received by the fastest receiving communications device;

transmitting the email name and the stored received fax message to the user's electronic mailbox wherein the received fax message is communicated between the sending fax device and the user's electronic mailbox in real time; and using the email name to identify the sending fax device.

* * * * *